UNITED STATES PATENT OFFICE.

GRIGORI PETROFF, OF ST. PETERSBURG, RUSSIA.

PROCESS FOR THE EXTRACTING AND SEPARATING SULFO-ACIDS FROM CRUDE-PETROLEUM HYDROCARBONS AND ACID RESIDUES.

1,087,888.      Specification of Letters Patent.      Patented Feb. 17, 1914.

No Drawing.      Application filed March 31, 1913. Serial No. 757,907.

*To all whom it may concern:*

Be it known that I, GRIGORI PETROFF, chemist, a subject of the Czar of Russia, residing at 23 Pesotchnaia ulitcza, St. Petersburg, Russia, have invented certain new and useful Improvements in Processes for the Extracting and Separating Sulfo-Acids from Crude-Petroleum Hydrocarbons and Acid Residues, of which the following is a specification.

It is well known that by the treatment of certain varieties of crude petroleum or distillates thereof, with strong sulfuric acid, or with sulfuric anhydrid or with a mixture of these (fuming sulfuric acid) organic sulfo-acids are produced. It has been proposed to neutralize these bodies with alkalis, and thereafter to wash out and purify the sulfo-acids, by means of water. Another method of obtaining these substances from acid tar, is to convert the sulfo-acids into their calcium salts and to purify these by crystallization. These methods are both open to the objection that the sulfo-acids, as well as the alkali metal salts, and alkaline earth metal salts, form emulsions with water from which the sulfo-acids or their salts cannot be readily separated.

The present invention is based upon my discovery that these sulfo-acids obtained as above described are only in part carried into the acid tar, the remainder remaining dissolved in the unattacked oil (the upper layer). I have found that when a mixture containing these sulfo-acids is washed with a small quantity of ethyl alcohol, wood alcohol, or acetone, the sulfo-acids dissolve in these solvents, and are thereby separated from the oils and the sulfo-acids can be easily extracted from the solution in these solvents by distilling the solvent, leaving the sulfo-acids in a comparatively pure state as a residue. These sulfo-acids are then in the form of a solid or semi-solid non-crystalline mass having a yellow color, soluble in water, which consists of a mixture of sulfo-acids of the carbo cyclic series, containing in their molecule one sulfo group, and all these have a molecular weight higher than 250. The aqueous solutions of the acids or of their alkali metal salts, possess strong emulsifying properties, and accordingly can be used as detergents or for other purposes.

When the oil is treated with fuming sulfuric acid, stirred, and then allowed to settle, two layers are formed, namely an upper layer containing the unacted upon hydrocarbons, principally of the aliphatic series, and a lower layer commonly referred to as acid sludge. The upper layer contains some of the sulfo-acids, which can be readily separated therefrom by agitating the same with alcohol or acetone as above referred to, while that portion of the sulfo-acids which exists in the sludge can be extracted by treating said sludge with a petroleum distillate such as kerosene or gasolene, which solution may thereafter be treated with alcohol, wood alcohol, or acetone.

In order to make my invention perfectly clear I give the following specific example, but this example is for the purpose of illustration only: 10,000 kgs. of crude distillate of Baku petroleum (specific gravity .88), after being treated with small quantity of 98% sulfuric acid, is again treated with about 25% its weight of fuming sulfuric acid and agitated, after which it is allowed to settle into an upper layer A, and a lower layer B. This lower layer B, consisting of acid sludge, is removed. The upper layer A, is mixed with say 400 kgs. of an organic solvent, which is soluble in water, such as alcohol, wood alcohol, or acetone, and which may consist of dilute alcohol (2 parts of water to 1 part of alcohol, by volume) the mixture stirred and allowed to settle, forming two layers, C and D. The lower layer D may consist of 800 kgs. of a heavy, limpid liquid containing 400 kgs. of the organic sulfo-acids, and this liquid may be used if desired for washing a further amount of A, for the purpose of increasing the proportion of sulfo-acids in said liquid D.

The acid sludge (B) is first treated with water, for the purpose of separating its content of free sulfuric acid. The remainder is thoroughly mixed with a portion of the upper layer (A) above referred to, or gasolene, kerosene, or a mineral oil, which dissolves from the sludge, substantially all its content of sulfo-acids. This liquid solution of the sulfo-acids is then treated as above described with alcohol, wood alcohol, or acetone, and the sulfo-acids are separated from this by distilling off the solvent.

The quantity of sulfo-acids which can be recovered from the upper layer, depends upon the character of the mineral oils treated, the quantity and strength of the sulfuric employed, and upon other working conditions. The stronger the sulfuric acid employed (in anhydrid) the greater will be the amount of sulfo-acids obtained.

The sulfo-acids as obtained by this process are soluble in water, are solid or semisolid, and have a yellow color.

What I claim is:—

1. A process of producing sulfo-acids which comprises treating a hydrocarbon oil which contains compounds of the carbocyclic series with sulfuric acid containing free anhydrid; then allowing the mass to separate into two layers A and B, washing the upper layer A, with a water-soluble organic solvent of the sulfo-acids, and extracting the lower layer B, with a hydrocarbon oil, to produce a solution of sulfo-acids therein, and washing said solution with a water-soluble organic solvent.

2. In the extraction of sulfo-acids from mixtures comprising said acids and mineral oils, the step of treating said mixture with a liquid comprising alcohol in admixture with more than its own volume of water to dissolve said sulfo-acids, and separating the sulfo-acids from said solvent.

3. A process of obtaining sulfo-acids from acid sludge, which comprises treating said sludge with an oil consisting essentially of hydrocarbons, whereby the sulfo-acids are taken up by said oil, thereafter treating said mixture of oil and sulfo-acids with an organic water-soluble solvent of said sulfo acids, and thereafter separating said sulfo-acids from said solvent.

4. A process of obtaining sulfo-acids which comprises treating a hydrocarbon oil which contains compounds of the carbocyclic series with sulfuric acid containing free sulfuric anhydrid, then allowing the mass to separate into two layers, A and B, washing the upper layer A with a mixture of alcohol and water, to dissolve the sulfo-acids therein contained, extracting the lower layer B with a hydrocarbon oil to produce a solution therein of the sulfo-acids contained in said lower layer, and washing said solution of sulfo acids in hydrocarbon oil, with a mixture of alcohol and water.

In testimony whereof I affix my signature in presence of two witnesses.

GRIGORI PETROFF.

Witnesses:
    C. J. HOMICOS,
    FELECOFF.